United States Patent [19]

Hoare et al.

[11] 4,101,070
[45] Jul. 18, 1978

[54] CENTRIFUGE ROTOR COUPLING

[75] Inventors: Gordon Harold Hoare, Horsham; Brian Walter Lovegrove, Crawley, both of England

[73] Assignee: Fisons Limited, London, England

[21] Appl. No.: 761,669

[22] Filed: Jan. 24, 1977

[30] Foreign Application Priority Data

Feb. 7, 1976 [GB] United Kingdom ............... 4848/76

[51] Int. Cl.² ........................................ B04B 9/00
[52] U.S. Cl. ............................. 233/1 R; 233/23 R; 64/28 R; 403/348
[58] Field of Search ............... 233/19 R, 23 R, 27, 233/24, 1 R, 1 B; 64/28 R, DIG. 2; 403/348, 349, 334, 333

[56] References Cited

U.S. PATENT DOCUMENTS

| 1,550,779 | 8/1925 | Carpenter | 64/DIG. 2 |
| 2,613,968 | 10/1952 | Harstick et al. | 233/23 R |
| 3,327,819 | 6/1967 | Warwick | 64/28 R |
| 3,405,789 | 10/1968 | Orwin et al. | 64/28 R |
| 3,532,008 | 10/1970 | Fanstone | 64/28 R |

FOREIGN PATENT DOCUMENTS

| 408,635 | 1/1910 | France | 233/23 R |
| 391,327 | 3/1924 | Fed. Rep. of Germany | 233/24 |
| 460,070 | 2/1975 | U.S.S.R. | 233/19 R |

Primary Examiner—George H. Krizmanich
Attorney, Agent, or Firm—Merriam, Marshall & Bicknell

[57] ABSTRACT

The invention relates to a modified bayonet type mounting for use in a centrifuge. The mounting is characterized by having the trailing wall of the socket inclined at an obtuse angle, whereby relative rotation of the drive shaft and rotor during start-up causes the pin of the bayonet mounting to move deeper into the socket.

8 Claims, 3 Drawing Figures

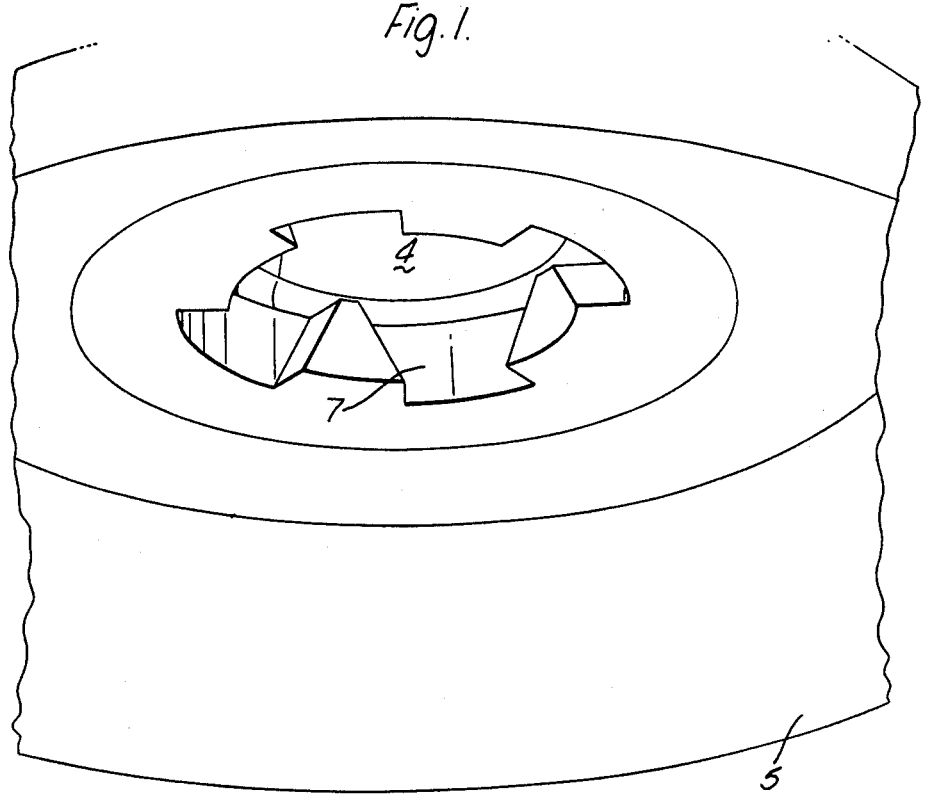
Fig. 1.
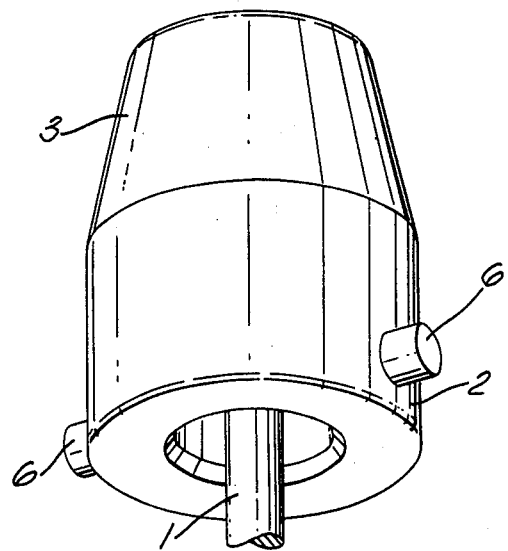

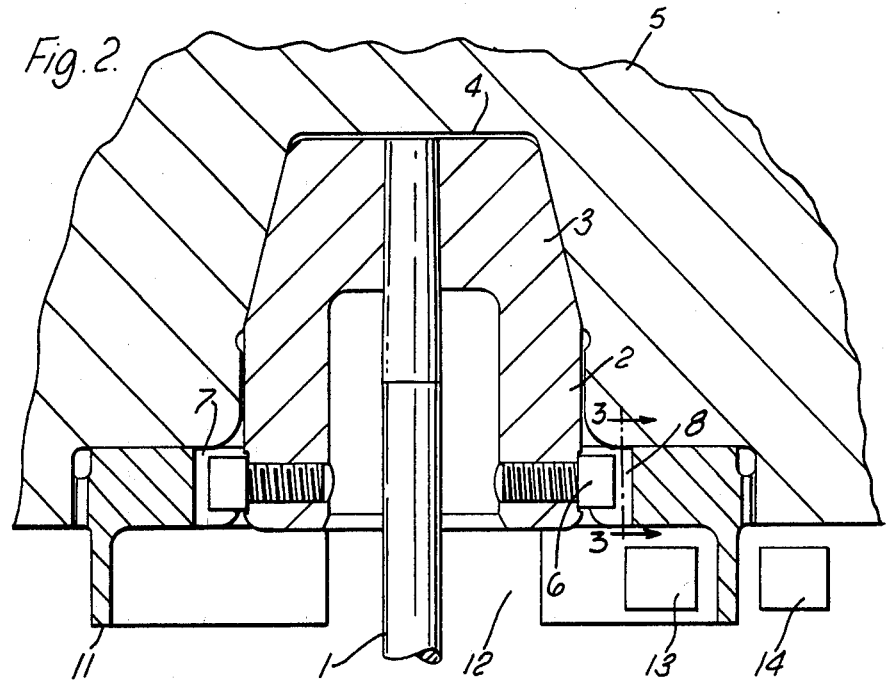
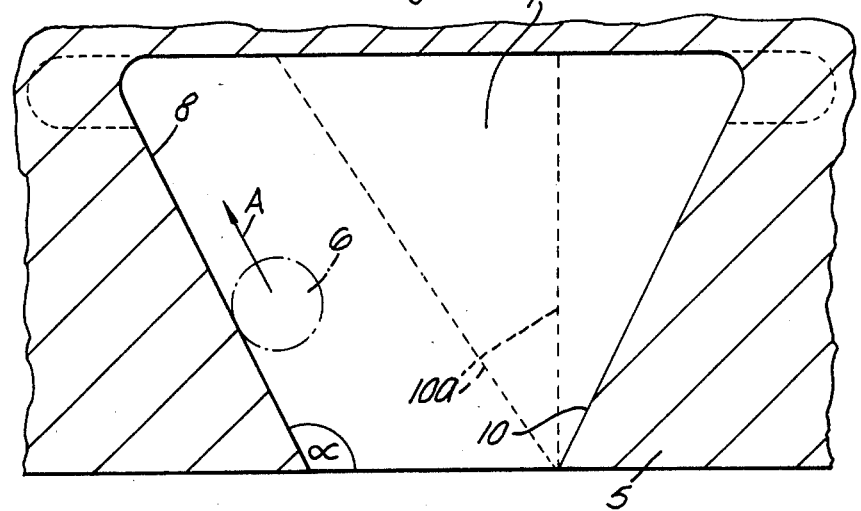

CENTRIFUGE ROTOR COUPLING

The present invention relates to a device.

In some forms of centrifuge, the rotor or bowl is removable from its drive shaft and is located on the free end of the drive shaft by means of a tapered socket which engages the tapered free end of the shaft. For convenience the term rotor will be used herein to denote collectively all forms of rotor, bowl or other rotatable head assembly for use on centrifuges. Whilst it has been proposed to incorporate a bayonet type mounting in such an assembly to lock the rotor on the shaft, there is a tendency for the rotor to be only partially locked in place and to ride up on the tapered end of the shaft, thus disengaging the locking pins from the sockets of the bayonet mounting. This results in slip between the shaft and the rotor. We have now devised a modified form of construction of the bayonet mounting which overcomes the above problems. The term bayonet type mounting is used herein to denote a linkage in which a transverse pin on one member is separably engaged with a longitudinal socket in another member, the socket having one longitudinal and one transverse opening thereinto.

Accordingly, the present invention provides a centrifuge assembly wherein a rotor is adapted to be removably mounted upon a drive shaft by means of a bayonet type mounting characterised in that a socket of the mounting has a side wall inclined at an obtuse angle to a plane normal to the axis of intended rotation of the rotor whereby upon relative rotation of the shaft and the rotor a component of force is generated which urges the pin of the mounting to move deeper into the socket of the mounting.

The angles quoted herein for the inclination of the side wall(s) of the socket are measured within the socket at the open end of the socket.

Preferably, both side walls of the socket are inclined to the plane, notably so as to form a socket with divergent walls.

A preferred form of the centrifuge assembly will now be described by way of example only with respect to the accompanying drawings in which:

FIG. 1 is a diagrammatic elevational view from below and to one side of the rotor and shaft of the centrifuge;

FIG. 2 is a vertical section through the rotor and shaft of FIG. 1 with the rotor locked onto the shaft; and FIG. 3 is a detailed vertical section along the line 3—3 in FIG. 2, through part of the bayonet type mounting of the device of FIG. 1.

The centrifuge comprises a housing and drive means (not shown) which are of conventional design. The rotor is of conventional design, except for the sockets by which it is mounted on the free end of the drive shaft (which is also of conventional design). The shaft 1 carries a drive head 2 having a tapered tip 3 which is a close fit into a corresponding central recess 4 in the base of the rotor 5. Drive head 2 is provided with two diametrically opposed locking pins 6.

The recess 4 in the rotor 5 is provided with four sockets 7 equally spaced circumferentially around the interior surface of the wall of the recess. The sockets 7 have an open end at the open end of recess 4 and present an open face into recess 4. The side walls of the sockets 7 diverge as shown in FIG. 3 to provide a type of bayonet socket. Pins 6 enter the open ends of two opposed sockets 7 as the rotor is located on drive head 2. If the sockets 7 and pins 6 are not in register, the rotor 5 may be rotated until they are in register and the rotor drops into place with drive head 2 located in recess 4 and pins 6 located in sockets 7 as shown in FIG. 2. If desired, a second pair of pins 6 may be provided to locate in the second pair of sockets 7. If desired, the sockets may be formed in an insert piece which is then inserted into recess 4.

When drive shaft 1 is rotated, the rotor rotates with it. However, some slip will occur causing pins 6 to butt up against the trailing walls 8 of sockets 7, as shown in FIG. 3. By virtue of the angle of the walls 8 the pin is urged inwards, i.e along arrow A, thus drawing the rotor more tightly down on drive head 2. When drive head 2 is slowed down, the pin 6 is no longer urged inwards, but still bears against wall 8 to prevent premature removal of the rotor. When drive head 2 is stationary, the rotor may be readily removed. If need be, the rotation of drive head 2 may be reversed momentarily to break the grip between the mating surfaces of head 2 and recess 4.

In this way there is provided a simple means by which the rotor may be located on the drive shaft with reduced risk of mis-locking in that it is simple to determine when the pins 6 have entered sockets 7. The locking effect is ensured during start up of the rotor despite relative rotation of the drive shaft and rotor.

The above simple form of device may be modified in a number of ways. Thus, the rotor 5 could carry pins 6 and drive head 2 could be provided with recess 4 in the end thereof; sockets 7 could have their upper corners rounded or recessed as shown dotted in FIG. 3 so that the stresses on pins 6 and walls 8 may be more evenly spread; or pin 6 may be given a flat angled face parallel to the slope of wall 8 to spread the area of contact between pins 6 and walls 8. Where rotor 5 is to be rotated in one direction only, the leading wall 10 of each socket 7 need not be inclined but may be upright, or may be parallel to the trailing wall 8 (as shown dotted 10a) thus forming an inclined channel up which pins 6 are driven. It is however preferred to provide divergent side walls to socket 7 as shown. The side wall 8 is at an obtuse angle (i.e. $\alpha$ has a value of between 90° and 180°) to the plane normal to the axis of rotation of the rotor. It is preferred that $\alpha$ have a value of from 120° to 135°. Often the rotor 5 will have a planar base face and the plane of this face will be normal to the axis of rotation of the rotor. In such cases the angle of inclination of the side walls of the sockets 7 is measured with respect to the base face.

From the above description it will be seen that in a preferred embodiment thereof the present invention provides a centrifuge assembly comprising a rotor to be mounted upon a rotable drive shaft wherein the drive shaft is provided with a tapered tip thereto and the rotor base is provided with a substantially central recess in the base thereof in which the tapered tip of the drive shaft is to be engaged; the recess being provided at the periphery thereof with two or more substantially symmetrically disposed longitudinal sockets, each socket presenting an open face to the recess and to the base of the rotor, said sockets having a side wall inclined at an obtuse angle to the plane normal to the intended axis of rotation of the rotor; the drive shaft being provided with two or more transverse pins which are to be engaged in the longitudinal sockets of the recess when the rotor is mounted upon the drive shaft.

As indicated above, apart from the provision of the inclined wall or walls to socket 7, the centrifuge is basically of conventional design or construction. However, we also prefer to provide the rotor with means for sensing its speed of rotation. Conveniently, this takes the form of a circular or annular path on the rotor which path has a change of property built into it. This change of property may take the form of a reflective portion of the path which reflects light to a light sensitive cell as it passes a given point, the cell causing a pulse of energy which can be detected and used to indicate the speed of rotation. However, a particularly preferred form of speed sensor is an annular skirt 11 mounted on the base of the rotor substantially co-axially with the axis of rotation of the rotor, see FIG. 2. The skirt 11 is cut with one or more openings 12. An infra-red generator 13 and an infra-red sensor 14 are mounted on either side of the skirt 11 so that the opening(s) 12 pass between them as the bowl is rotated. The system operates as follows: as rotor 5 rotates, so skirt 11 is carried between the generator 13 and the sensor 14; as the opening(s) 12 pass between the generator 13 and sensor 14, the sensor 14 detects the infra-red radiation generated by generator 13; the sensor generates a signal in response to the radiation which signal is fed to a conventional system for monitoring the signals generated and which can be set to control the speed of the drive motor to achieve a given speed of rotation. The signals may either be monitored merely by counting them or by estimating their duration and cutting off the motor drive when the signals reach a given brevity.

The speed control method outlined above may be varied, for example, by having the pathway as an interrupted circular plate let into the base of the rotor and by scanning reflection of light from the plate. In addition, the method may be used to sense when rotation of the rotor has virtually ceased so that, say, a safety lock on the lid of the centrifuge cabinet can be released, thus ensuring that the cabinet can only be opened when the rotor has substantially ceased rotation.

From the above description, it will be appreciated that a conventional drive shaft with a drive head having the pins of a normal bayonet mounting may be used with a modified rotor.

The invention therefore also provides a rotor having a longitudinal axis of rotation for use in a centrifuge which rotor is to be mounted terminally upon a longitudinal drive shaft carrying a transverse pin, characterised in that the rotor is provided with a recess in the base thereof adapted to receive the end of the drive shaft, which recess is provided with a longitudinal socket adapted to received the transverse pin, a side wall of said socket being inclined at an obtuse angle to a plane normal to the intended axis of rotation of the rotor whereby when the pin bears against the inclined wall a force is generated urging the pin to move longitudinally deeper into the recess.

We claim:

1. A centrifuge assembly comprising a rotor; a rotatable drive shaft; bayonet mounting means for removably engaging said rotor to said drive shaft, said mounting means comprising a first member attached to one of said rotor and said drive shaft and a second member attached to the other of said rotor and said drive shaft, said first member being provided with a central longitudinal recess and at least one peripheral socket communicating with said recess, said socket having at least two opposed side walls, at least one of which is inclined at an obtuse angle to a plane normal to the axis of rotation of said rotor; said second member comprising a drive head adapted to be received in said recess of said first member, said drive head having at least one transverse pin extending radially outwardly therefrom and adapted to be received in said socket when said first and second members are engaged, whereby on relative rotation of said first and second members, said pin bears against said side wall to generate a longitudinal component of force tending to urge said first and second members together.

2. A centrifuge assembly as claimed in claim 1 wherein both side walls of the socket are inclined at obtuse angles of the plane normal to the axis of intended rotation of the rotor.

3. A centrifuge assembly as claimed in claim 1 wherein both side walls are inclined at an angle of from 120° to 135° to the plane normal to the axis of intended rotation of the rotor.

4. A centrifuge assembly as claimed in claim 1 wherein the rotor is provided with the socket and the drive shaft is provided with the transverse pin.

5. A centrifuge assembly as claimed in claim 1 wherein there are provided means for sensing the speed of rotation of the rotor.

6. A centrifuge assembly comprising a rotor to be mounted upon a rotable drive shaft wherein the drive shaft is provided with a tapered tip thereto and the rotor base is provided with a substantially central recess in the base thereof in which the tapered tip of the drive shaft is to be engaged; the recess being provided at the periphery thereof with at least two substantially symmetrically disposed longitudinal sockets, each socket presenting an open face to the recess and to the base of the rotor, said sockets having a side wall inclined at an obtuse angle to the plane normal to the intended axis of rotation of the rotor; the drive shaft being provided with at least two transverse pins which are to be engaged in the longitudinal sockets of the recess when the rotor is mounted upon the drive shaft.

7. A centrifuge assembly as claimed in claim 6 wherein the side wall of the socket is inclined at from 120° to 135° to the plane of the base of the rotor.

8. A rotor having a longitudinal axis of rotation for use in a centrifuge which rotor is to be mounted terminally upon a longitudinal drive shaft carrying a transverse pin, characterised in that the rotor is provided with a recess in the base thereof adapted to receive the end of the drive shaft, which recess is provided with a longitudinal socket adapted to receive the transverse pin, a side wall of said socket being inclined at an obtuse angle to a plane normal to the intended axis of rotation of the rotor whereby when the pin bears against the inclined wall a force is generated urging the pin to move longitudinally deeper into the socket.

* * * * *